United States Patent
Munoz Constantine et al.

(10) Patent No.: US 11,791,731 B2
(45) Date of Patent: *Oct. 17, 2023

(54) DISCONTINUOUS CONDUCTION MODE (DCM) VOLTAGE REGULATOR CIRCUIT WITH REDUCED OUTPUT VOLTAGE RIPPLE

(71) Applicant: Intel Corporation, Santa Clara, CA (US)

(72) Inventors: Juan Munoz Constantine, Hillsboro, OR (US); Alexander Lyakhov, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 17/197,532

(22) Filed: Mar. 10, 2021

(65) Prior Publication Data

US 2021/0194371 A1    Jun. 24, 2021

Related U.S. Application Data

(63) Continuation of application No. 16/378,412, filed on Apr. 8, 2019, now Pat. No. 10,951,117.

(51) Int. Cl.
*G06F 1/28* (2006.01)
*H02M 3/158* (2006.01)
*H02M 1/14* (2006.01)

(52) U.S. Cl.
CPC .......... *H02M 3/1584* (2013.01); *G06F 1/28* (2013.01); *H02M 1/14* (2013.01); *H02M 3/1586* (2021.05)

(58) Field of Classification Search
CPC .... H02M 3/1584; H02M 1/14; H02M 3/1586; G06F 1/28
See application file for complete search history.

(56) References Cited

U.S. PATENT DOCUMENTS 6,650,556 B2 * 11/2003 Dinh ................. H02M 3/1584
                                                363/124
9,691,538 B1 * 6/2017 Ikriannikov ............ H01F 27/38
(Continued)

FOREIGN PATENT DOCUMENTS

KR    10-2016-0096560 A    8/2016

OTHER PUBLICATIONS

International Search Report and Written Opinion dated Jun. 22, 2020 for International Application No. PCT/US2020/020701, 8 pages.

(Continued)

*Primary Examiner* — Aurel Prifti
(74) *Attorney, Agent, or Firm* — Schwabe, Williamson & Wyatt, P.C.

(57) ABSTRACT

Various embodiments provide a voltage regulator circuit including two or more discontinuous conduction mode (DCM) phases coupled to an output node and coupled in parallel with one another. A control circuit may detect a trigger and switch all of the two or more DCM phases to a first state (charge state) responsive to the detection. The control circuit may switch a first DCM phase, of the two or more DCM phases, to a second state (discharge state) after a first predetermined time period in the first state and may switch a second DCM phase, of the two or more DCM phases, to the second state after a second predetermined time period in the first state, wherein the second predetermined time period is different than the first predetermined time period. Other embodiments may be described and claimed.

21 Claims, 4 Drawing Sheets

(56) References Cited

U.S. PATENT DOCUMENTS

| | | | | |
|---|---|---|---|---|
| 9,929,650 | B1* | 3/2018 | Kirchner | H02M 3/158 |
| 10,291,117 | B2* | 5/2019 | Petersen | H02M 3/156 |
| 2011/0057632 | A1* | 3/2011 | Cheng | H02M 3/156 323/234 |
| 2013/0049715 | A1* | 2/2013 | Groom | H02M 3/156 323/271 |
| 2014/0176097 | A1* | 6/2014 | Huang | G05F 1/59 323/272 |
| 2015/0303799 | A1* | 10/2015 | Tang | H02M 3/1584 323/271 |
| 2016/0013719 | A1* | 1/2016 | Babazadeh | H02M 3/157 323/271 |
| 2016/0116549 | A1* | 4/2016 | Mathew | G06F 1/30 702/60 |
| 2016/0233766 | A1* | 8/2016 | Todorov | H02M 3/1584 |
| 2016/0301303 | A1* | 10/2016 | Bari | H02M 3/156 |
| 2017/0019026 | A1* | 1/2017 | Nien | H02M 3/1584 |
| 2017/0179822 | A1* | 6/2017 | Kobayashi | H02M 3/158 |
| 2017/0248996 | A1* | 8/2017 | Zhang | G06F 1/26 |
| 2017/0310238 | A1 | 10/2017 | Fu | |
| 2018/0013348 | A1* | 1/2018 | Paul | H02M 1/083 |
| 2018/0019655 | A1 | 1/2018 | Amirabadi | |
| 2018/0026526 | A1* | 1/2018 | Ahmed | H02M 3/07 323/271 |
| 2018/0191333 | A1* | 7/2018 | Chen | H02M 3/156 |
| 2018/0219485 | A1* | 8/2018 | Babazadeh | H02M 1/32 |
| 2018/0294726 | A1* | 10/2018 | Priego | H02M 3/1584 |
| 2022/0060115 | A1* | 2/2022 | Huang | H02M 1/32 |
| 2022/0337161 | A1* | 10/2022 | Hsiao | H02M 3/1586 |

OTHER PUBLICATIONS

Notice of Allowance dated Oct. 7, 2020 for U.S. Appl. No. 16/378,412, 13 pages.

* cited by examiner

DISCONTINUOUS CONDUCTION MODE (DCM) VOLTAGE REGULATOR CIRCUIT WITH REDUCED OUTPUT VOLTAGE RIPPLE

CROSS REFERENCE TO RELATED APPLICATIONS

This application is a continuation of U.S. patent application Ser. No. 16/378,412, entitled "DISCONTINUOUS CONDUCTION MODE (DCM) VOLTAGE REGULATOR CIRCUIT WITH REDUCED OUTPUT VOLTAGE RIPPLE" filed on Apr. 8, 2019, and claims priority to the Ser. No. 16/378,412 application. The entire contents of the Ser. No. 16/378,412 application is incorporated herein by reference.

FIELD

Embodiments of the present invention relate generally to the technical field of electronic circuits, and more particularly to a discontinuous conduction mode (DCM) voltage regulator circuit.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Discontinuous conduction mode (DCM) voltage regulators (e.g., direct current (DC)-DC converters) have high efficiency at low output currents. It is desirable to have low ripple of the output voltage generated by the DCM voltage regulator. Existing techniques to mitigate voltage ripple in DCM voltage regulators include having two DCM phases with a 180 degree phase shift, and increasing the capacitance at the output. Having two DCM phases with a 180 degree phase shift requires increased complexity in the controller and lower efficiency. Additionally, increasing the output capacitance requires significant area overhead.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
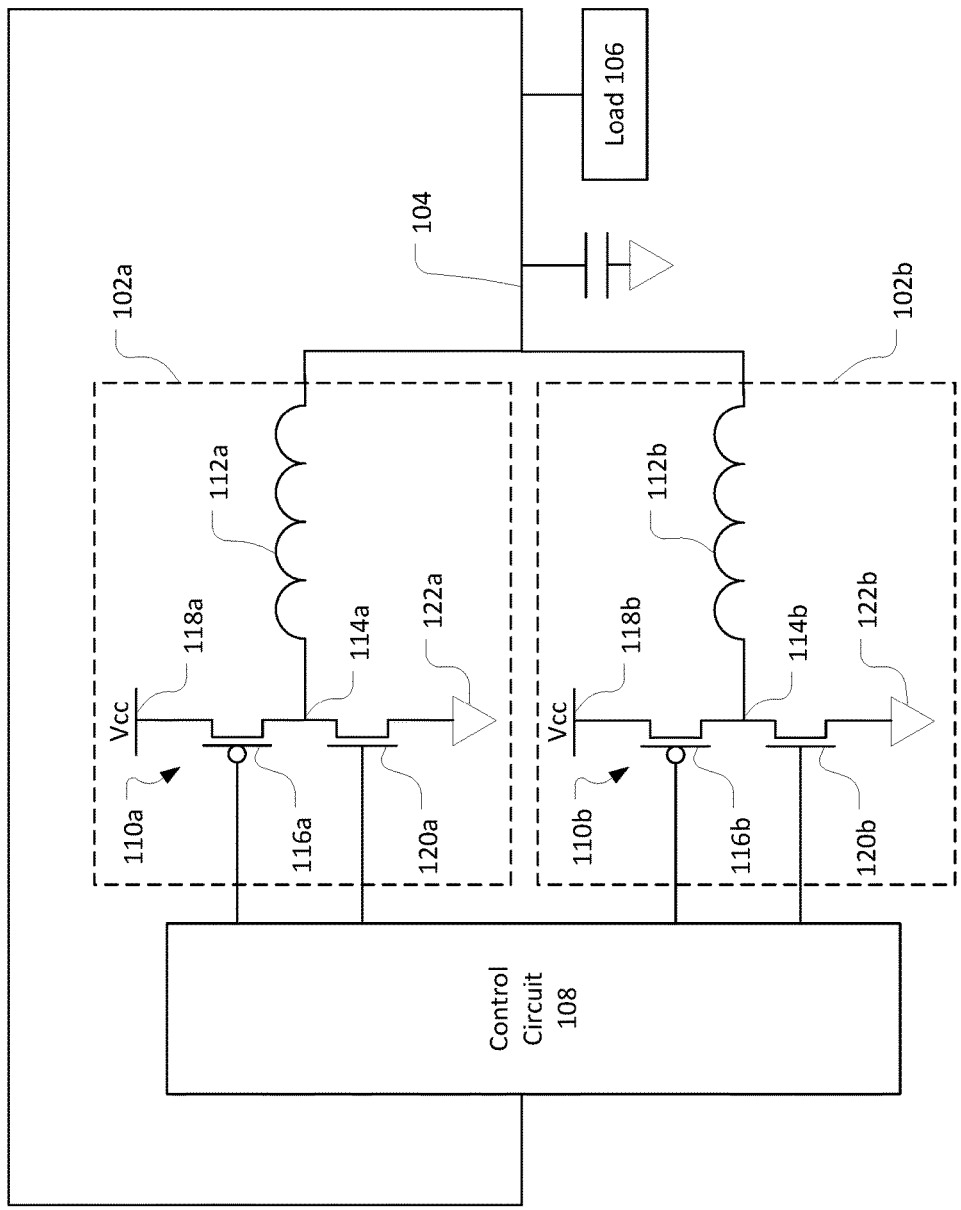
FIG. 1 illustrates a voltage regulator circuit including two or more discontinuous mode (DCM) phases, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Various embodiments provide a voltage regulator circuit including two or more discontinuous conduction mode (DCM) phases coupled to an output node and coupled in parallel with one another. A control circuit may detect a trigger and switch all of the two or more DCM phases to a first state (charge state) responsive to the detection. The control circuit may switch a first DCM phase, of the two or more DCM phases, to a second state (discharge state) after a first predetermined time period in the first state and may switch a second DCM phase, of the two or more DCM phases, to the second state after a second predetermined time period in the first state, wherein the second predetermined time period is different than the first predetermined time period.

The control circuit may switch the two or more DCM phases to the first state responsive to any suitable trigger, such as a detection that the output voltage is below a threshold voltage, the output of an error amplifier coupled to the output node, and/or the expiration of a timer (e.g., indicating a time period has elapsed since the last cycle of the DCM phases).

One benefit of techniques described herein is load management. During the initial phase when the first and second DCM phases are in the first state (e.g., the respective pull-up transistors are building current through the inductors), the resulting current delivered to the load will have a slope twice as fast as it would be if a single inductor were driving the load. Then, when the first DCM phase switches to the second state while the second DCM phase remains in the first state, the discharging of the second DCM phase may cancel out the charging of the first DCM phase, and the resulting current delivered to the load may be a DC-like current (e.g., substantially constant). When the second DCM phase switches to the second state, the first DCM phase may have already switched to a third state (e.g., tri-state mode, with both the pull-up transistor and pull-down transistor off). Accordingly, only one inductor is left to discharge and it will do so at a slower rate than if multiple inductors were discharging at the same time. This will, in turn, help avoid ripple at the output node and manage the charge and discharge of the output capacitor.

FIG. 1 illustrates a voltage regulator circuit 100 (hereinafter "circuit 100"), in accordance with various embodiments. The circuit 100 may include two or more discontinuous conduction mode (DCM) phases 102a-b coupled in parallel with one another to generate a regulated output voltage at an output node 104. The regulated output voltage may be provided to a load 106. The load 106 may be, for example, a circuit block that uses the regulated output voltage as a power supply. The circuit 100 may further include a control circuit 108 coupled to the DCM phases 102 to control operation of the DCM phases. For example, in some embodiments, the control circuit 108 may control operation of the DCM phases based on the output voltage and/or based on one or more timers, as further discussed herein.

Individual DCM phases 102a-b may include a driver circuit 110a-b (also referred to as a bridge circuit) coupled to an inductor 112a-b. In some embodiments, the inductor 112a-b of the respective DCM phase 102a-b may be coupled between the output node 104 and an internal node 114a-b of the driver circuit 110a-b. The driver circuit 110a-b may include a pull-up transistor 116a-b (also referred to as a high side transistor) coupled between the internal node 114a-b and a supply rail 118a-b. The supply rail 118a-b may receive a supply voltage (e.g., Vin), which may be a DC voltage. The driver circuit 110a-b may further include a pull-down transistor 120a-b (also referred to as a low side transistor) coupled between the internal node 114a-b and a ground terminal 122a-b. The supply rails 118a-b and/or ground terminals 122a-b of the respective driver circuits 110a-b may be the same and/or coupled to one another.

Additionally, other embodiments of the DCM phases 102a-b may include a different design, additional components, and/or a different configuration of the driver circuit 110a-b and/or inductor 112a-b, such as one or more additional transistors coupled between the supply rail 118a-b and the internal node 114a-b (e.g., in a cascode arrangement) and/or one or more additional transistors coupled between the internal node 114a-b and the ground terminal 122a-b.

In various embodiments, the control circuit 108 may provide respective control signals to the gate terminals of the pull-up transistors 116a-b and/or pull-down transistors 120a-b to control a state of the respective DCM phases 102a-b. For example, when the DCM phase 102a-b is in a first state (e.g., charge state), the control circuit 108 may turn on the respective pull-up transistor 116a-b and turn off the respective pull-down transistor 120a-b. Accordingly, the output node 104 may be coupled to the supply rail 118a-b via the inductor 112a-b and pull-up transistor 116a-b of the respective DCM phase 102a-b, thereby causing the current supplied from the DCM phase 102a-b to the output node 104 via the inductor 112a-b to increase.

When the DCM phase 102a-b is in a second state (e.g., discharge state), the control circuit 108 may turn off the respective pull-up transistor 116a-b and turn on the respective pull-down transistor 120a-b. Accordingly, the output node 104 may be coupled to the ground terminal 122a-b via the inductor 112a-b and pull-down transistor 120a-b of the respective DCM phase 102a-b, thereby causing the current supplied from the DCM phase 102a-b to the output node 104 via the inductor 112a-b to decrease. When the DCM phase 102a-b is in a third state (e.g., tri-state mode or standby mode), both the respective pull-up transistor 116a-b and pull-down transistor 120a-b may be off. Accordingly, the output node 104 may be uncoupled from both the supply rail 118a-b and the ground terminal 122a-b.

Operation of the circuit 100 will be described with reference to the graph 200a of FIG. 2A, graph 200b of FIG. 2B, and graph 200c of FIG. 2C. Graph 200a illustrates a first inductor current 202 that corresponds to the current through inductor 114a of DCM phase 102a, and a second inductor current 204 that corresponds to the current through inductor 114b of DCM phase 102b. Graph 200b illustrates a total output current 206 generated by the combination of the DCM phases 102a-b. Graph 200b also illustrates an equivalent DC current 208. Graph 200c illustrates an output voltage 210 generated by the combination of DCM phases 102a-b (e.g., the output voltage at the output node 104).

In various embodiments, when the control circuit 108 detects a trigger, the control circuit 108 may place all (e.g., both) the DCM phases 102a-b in the first state (charge state). The trigger may include one or more parameters. For example, the trigger may include that the output voltage has decreased below a threshold voltage. Alternatively, or additionally, the trigger may include a more complex feedback based on the output voltage, such as based on the output of an error amplifier (e.g., using a compensator and/or pulse width modulator). Other embodiments may alternatively or additionally use a timer to trigger the control circuit to switch all the DCM phases 102a-b to the first state after a certain time period has passed since the last cycle of the DCM phases 102a-b. Although embodiments herein are described mainly with reference to triggering the DCM phases 102a-b to switch to the first state based on the output voltage falling below a threshold, it will be apparent that many different suitable criteria or combinations of criteria may be used to determine when to switch the DCM phases 102*a-b* to the first state.

When the DCM phases 102*a-b* are switched to the first state, the pull-up transistors 116*a-b* may be turned on and the pull-down transistors 120*a-b* may be off. This is shown at time t0 in graphs 200*a-c*. The first inductor current 202 and second inductor current 204 both increase while the respective DCM phases 102*a-b* are in the first state. The total output current 206 may be the sum of the inductor currents 202 and 204. Accordingly, the total output current 206 may increase faster than the inductor current of a single phase (e.g., twice as fast for embodiments with two phases 102*a-b*). This may cause the output voltage 210, which is dropping in value, to more quickly recover and lead to less voltage droop than if a single phase were charging the output node 104. As shown in FIG. 2C, the output voltage may reach its lowest voltage level at time t1.

In various embodiments, the first DCM phase 102*a* may be in the first state (e.g., with the pull-up transistor 116*a* on) for a first time period. The time period β may be a set (e.g., programmed and/or pre-defined) time period. The second DCM phase 102 may be in the first state (e.g., with the pull-up transistor 116*b* on) for a second time period that is less than the first time period. For example, the first time period may be β, and the second time period may be α*β, where α is less than 1. In some embodiments, a may be any suitable value, such as 0.75 or less, or 0.5 or less. Graphs 200*a-c* illustrate an embodiment in which a is 0.5 (with the second time period being half as long as the first time period).

Accordingly, at time t2, which may be α*β (e.g., in nanoseconds) after time t0, the control circuit 108 may switch the second DCM phase 102*b* from the first state to the second state (e.g., with the pull-up transistor 116*b* off and the pull-down transistor 120*b* on), while the first DCM phase 102*a* remains in the first state. Accordingly, the second inductor current 204 may decrease, while the first inductor current 202 may continue to increase. In some embodiments, the decreasing slope of the second inductor current 204 may be substantially the opposite of the increasing slope of the first inductor current 202. Accordingly, the total output current 206 may be substantially constant for a time period after time t2 (e.g., the time period during which the first DCM phase 102*a* is in the first state and the second DCM phase 102*b* is in the second state).

At time t3, which may be β (e.g., in nanoseconds) after time t0, the control circuit 108 may switch the first DCM phase 102*a* from the first state to the second state (e.g., with the pull-up transistor 116*a* off and the pull-down transistor 120*a* on). Accordingly, the first inductor current 202 may begin to decrease. In some embodiments, the control circuit 108 may determine that the first DCM phase 102*a* should stay in the first state beyond the first predetermined time period under some circumstances, for example, based on the output voltage when the first predetermined time period expires.

In various embodiments, when the second inductor current 204 reaches zero, the control circuit 108 may switch the second DCM phase 102*b* from the second state to the third state (e.g., the pull-down transistor 120*b* may be turned off while the pull-up transistor 116*b* remains off). This transition is shown at time t3 in FIG. 2A. However, the second DCM phase 102*b* may not necessarily be switched to the third state at the same time that the first DCM phase 102*a* is switched to the second state. For example, the second time period for which the second DCM phase 102*b* is in the first state may not be half of the first time period for which the first DCM phase 102*a* is in the first state. Additionally, or alternatively, the time it takes for the second inductor current 204 to reach zero after switching from the first state to the second state may not be the same as the amount of time that the second DCM phase 102*b* is in the first state.

With the second inductor current 204 at zero and the first DCM phase 102*a* in the second state, the total output current 206 may decrease at a slower rate than the rate at which the total output current 206 increased between t0 and t2 (e.g., with both the first and second DCM phases 102*a-b* in the first state). The output voltage 210 may continue increasing until time t4, at which the output voltage 210 peaks and begins to decrease.

At time t5, the first inductor current 202 may reach zero. In response, the control circuit 108 may switch the first DCM phase 102*b* from the second state to the third state (e.g., the pull-down transistor 120*a* may be turned off while the pull-up transistor 116*a* remains off).

The first and second DCM phases 102*a-b* may remain in the third state until the next instance of the trigger (e.g., when the output voltage 210 again drops below the threshold), which is shown at time t6). Then the first and second DCM phases 102*a-b* may again be placed in the first state at the same time, and the process described above may be repeated.

In some embodiments, the control circuit 108 may switch the DCM phase 102*a* and/or 102*b* from the second state to the first state (without entering the third state in between) under some circumstances, such as if another trigger (which may be the same or different from the prior trigger) occurs while the DCM phase 102*a* and/or 102*b* is in the second state.

As can be seen in graph 200*c*, the voltage undershoots of the output voltage 208 may be quickly mitigated by both of the DCM phases 102*a-b* being switched on (e.g., in the first state) when the output voltage 208 drops below the threshold. Additionally, a large voltage overshoot of the output voltage 208 may be avoided by having the second DCM phase 102*b* switch to the second state (discharge state) before the first DCM phase 102*a* (e.g., causing the negative slope of the second inductor current 204 to at least partially cancel out the positive slope of the first inductor current 202.

Figure 3:
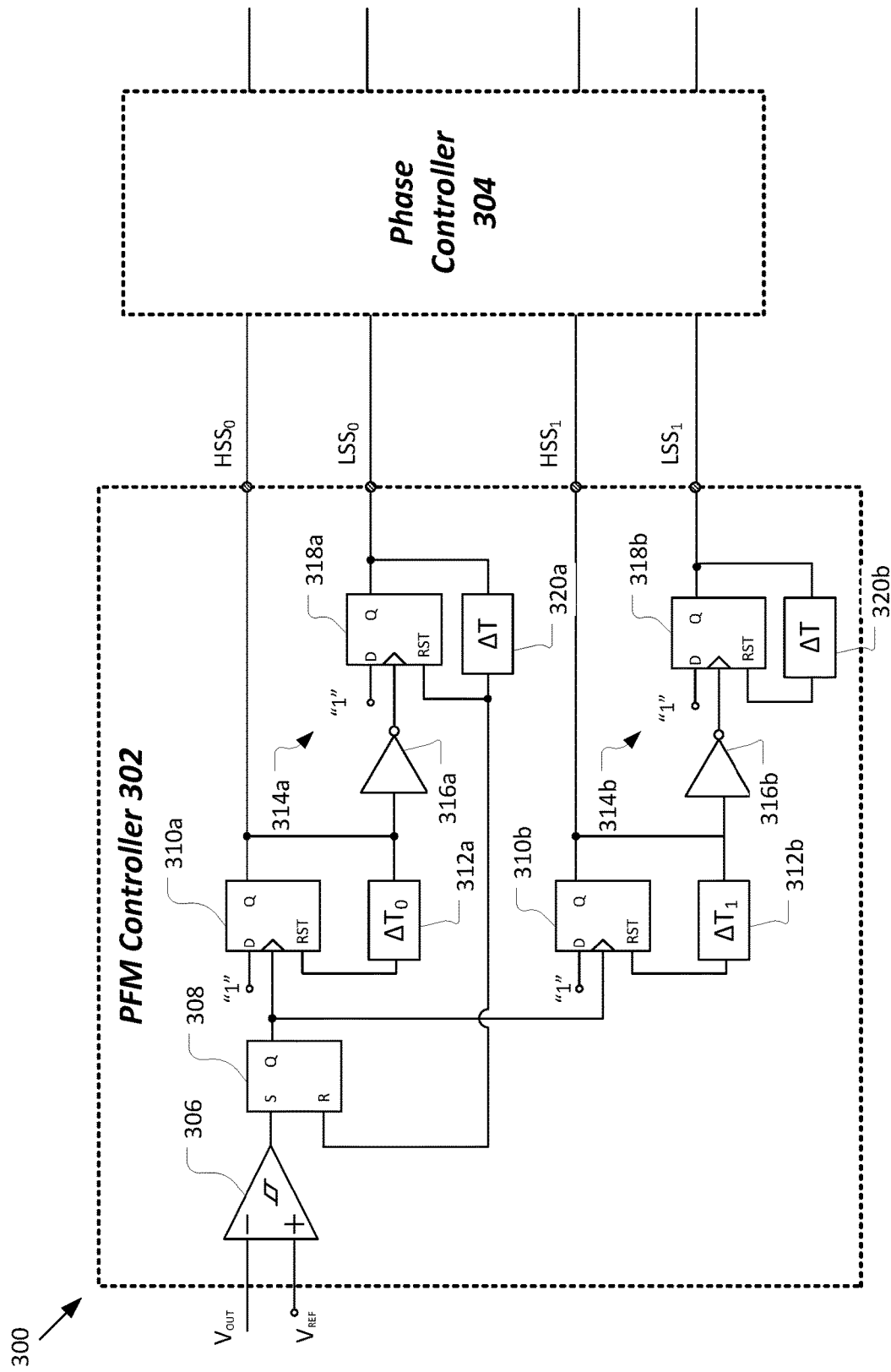
FIG. 3 illustrates control circuitry that may be included in the voltage regulator circuit of FIG. 1, in accordance with various embodiments.

FIG. 3 illustrates a control circuit 300 that may be one example implementation of the control circuit 108, in accordance with various embodiments. The control circuit 300 triggers the associated DCM phases to switch to the first state based on the output voltage provided by the DCM phases dropping below a threshold. It will be apparent that other embodiments may use other designs and/or modifications of the control circuit 108, whether based on the same trigger and/or based on one or more other triggers.

Control circuit 300 may include a PFM controller 302 and a phase controller 304. The PFM controller 302 may generate control signals to control the respective pull-up transistors 116*a-b* and pull-down transistors 120*a-b* of the DCM phases 102*a-b*. The phase controller 304 may level-shift and/or otherwise adapt the control signals to properly control the pull-up transistors 116*a-b* and pull-down transistors 120*a-b*.

In various embodiments, the PFM controller 302 may include a comparator 306 to compare the output voltage Vout (e.g., fed back from the output node 104) to a reference voltage Vref. The output of the comparator 306 may be coupled to a set (S) input of a set/reset (SR) latch 308. The SR latch 308 may catch the rising edge of the comparator 306 when the output voltage Vout falls below the reference voltage Vref, causing the output of the SR latch 308 to switch from logic 0 to logic 1. The SR latch 308 may isolate the rest of the PFM controller 302 from noise at the comparator output.

The output of the SR latch 308 may be coupled to the input of flip-flops 310a-b. The output of flip-flop 310a may be passed to the phase controller as control signal HSS0 to control the pull-up transistor 116a of the DCM phase 102a, while the output of flip-flop 310b may be passed to the phase controller as control signal HSS1 to control the pull-up transistor 116b of the DCM phase 102b. Accordingly, the transition in the output of the SR latch 308 responsive to the output of the comparator 306 will cause both of the flip-flops 310a-b to generate respective control signals HSS0 and HSS1 that will turn on both of the pull-up transistors 116a-b.

Each of the flip-flops 310a-b includes a feedback path with a respective delay cell 312a-b coupled between the output and the reset terminal of the respective flip-flop 310a-b. The delay provided by the delay cells 312a-b may correspond to the length of time that the respective DCM phases 102a-b will be in the first state. Accordingly, the delay cell 312a may provide a longer delay than the delay cell 312b. The flip-flops 310a-b may reset after the delay provided by the respective delay cell 312a-b, thereby causing the respective control signal HSS0 and HSS1 to turn off the respective pull-up transistor 116a-b.

Additionally, the PFM controller 302 may include low-side logic 314a-b to generate respective control signals LSS0 and LSS1 to control the respective pull-down transistors 120a-b of DCM phases 102a-b. Low side logic 314a-b may include an inverter 316a-b to receive the output of the respective flip-flop 310a-b and pass its inverted output to the input terminal of a flip-flop 318a-b. The output of the flip-flops 318a-b may be passed to the phase controller 304 as the respective control signals LSS0 and LSS1. Accordingly, the reset of the flip-flops 310a-b may also cause the respective flip-flop 318a-b to turn on the respective pull-down transistor 120a-b, thereby switching the respective DCM phase from the first state to the second state.

The flip-flops 318a-b may include a feedback path with a respective delay cell 320a-b coupled between the output and the reset terminal of the flip-flop 318a-b, thereby causing the flip-flop 318a-b to reset after a period of time. The corresponding change in the respective control signal LSS0 or LSS1 may trigger the phase controller 304 to monitor the inductor current of the respective DCM phase 102a-b and switch the DCM phase 102a-b to the third state (e.g., turn off the pull-down transistor 120a-b) when the inductor current reaches zero. In other embodiments, the phase controller 304 may monitor the inductor current and switch the DCM phase 102a-b to the third state independently of the reset of the flip-flops 318a-b.

The feedback path of the flip-flop 318a via delay cell 320a may also be fed back to the reset terminal of the SR latch 306. Accordingly, the feedback may reset the SR latch 306, thereby enabling the SR latch 308 to again respond to a change in the output of the comparator 306 (e.g., at the next time that the output voltage drops below the reference voltage).

Figure 4:
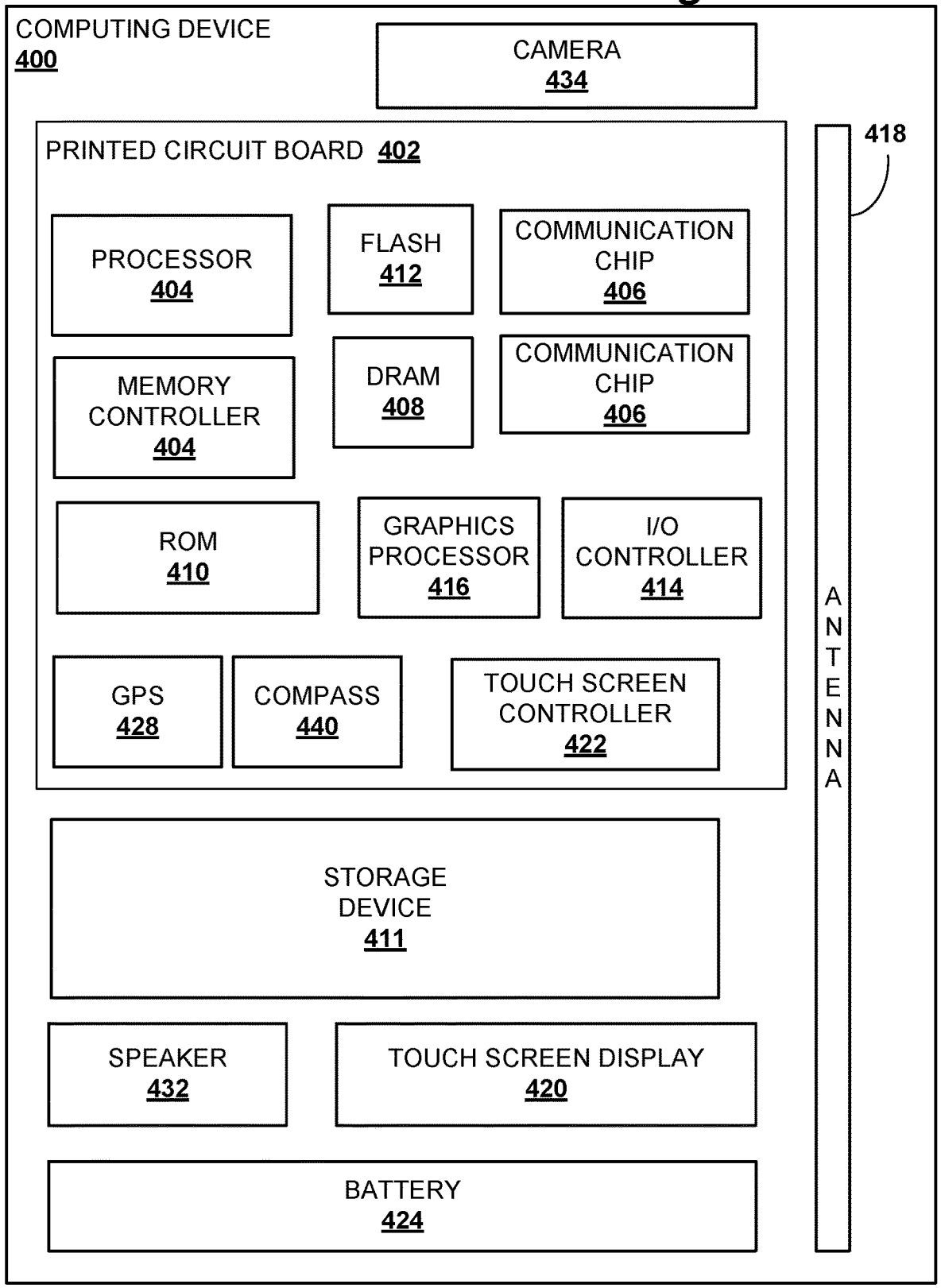
FIG. 4 illustrates an example system configured to employ the apparatuses and methods described herein, in accordance with various embodiments.

FIG. 4 illustrates an example computing device 400 that may employ the apparatuses and/or methods described herein (e.g., circuit 100, the signals of FIGS. 2A-C, and/or control circuit 300, etc.), in accordance with various embodiments. As shown, computing device 400 may include a number of components, such as one or more processor(s) 404 (one shown) and at least one communication chip 406. In various embodiments, the one or more processor(s) 404 each may include one or more processor cores. In various embodiments, the at least one communication chip 406 may be physically and electrically coupled to the one or more processor(s) 404. In further implementations, the communication chip 406 may be part of the one or more processor(s) 404. In various embodiments, computing device 400 may include printed circuit board (PCB) 402. For these embodiments, the one or more processor(s) 404 and communication chip 406 may be disposed thereon. In alternate embodiments, the various components may be coupled without the employment of PCB 402.

Depending on its applications, computing device 400 may include other components that may or may not be physically and electrically coupled to the PCB 402. These other components include, but are not limited to, memory controller 405, volatile memory (e.g., dynamic random access memory (DRAM) 408), non-volatile memory such as read only memory (ROM) 410, flash memory 412, storage device 411 (e.g., a hard-disk drive (HDD)), an I/O controller 414, a digital signal processor (not shown), a crypto processor (not shown), a graphics processor 416, one or more antenna 418, a display (not shown), a touch screen display 420, a touch screen controller 422, a battery 424, an audio codec (not shown), a video codec (not shown), a global positioning system (GPS) device 428, a compass 430, an accelerometer (not shown), a gyroscope (not shown), a speaker 432, a camera 434, and a mass storage device (such as hard disk drive, a solid state drive, compact disk (CD), digital versatile disk (DVD)) (not shown), and so forth. In various embodiments, the processor 404 may be integrated on the same die with other components to form a System on Chip (SoC).

In some embodiments, the one or more processor(s) 404, flash memory 412, and/or storage device 411 may include associated firmware (not shown) storing programming instructions configured to enable computing device 400, in response to execution of the programming instructions by one or more processor(s) 404, to practice all or selected aspects of the methods described herein. In various embodiments, these aspects may additionally or alternatively be implemented using hardware separate from the one or more processor(s) 404, flash memory 412, or storage device 411.

Figure 2A:
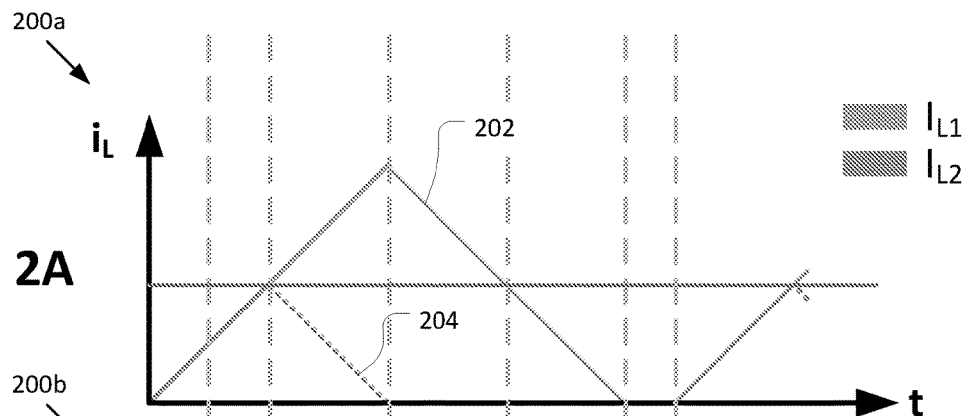
FIG. 2A illustrates a graph of the inductor currents in a first DCM phase and a second DCM phase, in accordance with various embodiments.
Figure 2B:
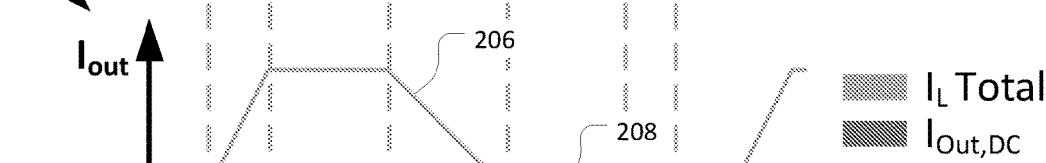
FIG. 2B illustrates a graph of the total inductor current at the output of the voltage regulator circuit, in accordance with various embodiments.
Figure 2C:
FIG. 2C illustrates a graph of the output voltage of the voltage regulator circuit, in accordance with various embodiments.

In various embodiments, one or more components of the computing device 400 may include circuit 100 and/or control circuit 300, use the signals of FIGS. 2A-C, and/or otherwise employ techniques described herein. For example, the processor 404, communication chip 406, I/O controller 414, memory controller 405, and/or another component of computing device 400 may include circuit 100 and/or control circuit 300, use the signals of FIGS. 2A-C, and/or otherwise employ techniques described herein.

The communication chips 406 may enable wired and/or wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to IEEE 702.20, Long Term Evolution (LTE), LTE Advanced (LTE-A), 5G, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth, and a second communication chip 406 may be dedicated to longer range wireless communications such as GPS, EDGE, GPRS, CDMA, WiMAX, LTE, Ev-DO, and others.

In various implementations, the computing device 400 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an automobile, a medical device, an appliance, a portable music player, a digital video recorder, an electronic sensor, a smart home device, an internet of things (IoT) device, etc. In further implementations, the computing device 400 may be any other electronic device that processes data.

Some non-limiting Examples of various embodiments are provided below.

Example 1 is a circuit comprising: a first discontinuous conduction mode (DCM) phase coupled with an output node; a second DCM phase coupled with the output node and coupled in parallel with the first DCM phase, wherein the first and second DCM phases are operable in a first state in which the output node is coupled to a supply rail via an inductor of the respective first or second DCM phase and a second state in which the output node is coupled to a ground terminal via the inductor of the respective first or second DCM phase; and a control circuit coupled with the first and second DCM phases. The control circuit is to: control, in response to a trigger, the first DCM phase and the second DCM phase to be in the first state concurrently; and switch the first DCM phase to the second state upon expiration of the first period of time from the trigger; and switch the second DCM phase to the second state upon expiration of the second period of time from the trigger, wherein the second period of time is less than the first period of time.

Example 2 is the circuit of Example 1, wherein the trigger includes: a detection that the output voltage is below a threshold; an output of an error amplifier coupled to the output node; or expiration of a timer.

Example 3 is the circuit of Example 1, wherein the first and second DCM phases are further operable in a third state in which the output node is uncoupled from the supply rail and the ground terminal via the inductor of the respective first or second DCM phase, wherein the control circuit is further to: switch the first DCM phase to the third state when a first current through the inductor of the first DCM phase reaches zero; and switch the second DCM phase to the third state when a second current through the inductor of the second DCM phase reaches zero.

Example 4 is the circuit of Example 3, wherein the first and second DCM phases each include: the inductor coupled between the output node and an internal node; a pull-up transistor coupled between the internal node and the supply rail; and a pull-down transistor coupled between the internal node and the ground terminal; wherein: when the respective DCM phase is in the first state, the pull-up transistor is on and the pull-down transistor is off; when the respective DCM phase is in the second state, the pull-up transistor is off and the pull-down transistor is on; and when the respective DCM phase is in the third state, the pull-up transistor is off and the pull-down transistor is off.

Example 5 is the circuit of Example 1, wherein the trigger is a first trigger, and wherein the control circuit is further to: switch, responsive to a second trigger after expiration of the first period of time, the first and second DCM phases from the second state to the first state.

Example 6 is the circuit of Example 1, wherein the output voltage is substantially constant between an end of the first period of time and an end of the second period of time.

Example 7 is the circuit of Example 1, wherein the second period of time is equal to or less than half the first period of time.

Example 8 is the circuit of Example 1, wherein the first and second periods of time have predetermined lengths.

Example 9 is the circuit of Example 1, further comprising one or more additional DCM phases coupled with the output node and in parallel with the first and second DCM phases, wherein the control circuit is to, in response to the detection, control the one or more additional DCM phases to be in the first state, concurrently with the first and second DCM phases, for respective time periods that are different than the first and second periods of time.

Example 10 is the circuit of Example 1, further comprising a circuit block coupled to the output node, wherein the circuit block is to use the output voltage as a power supply.

Example 11 is a voltage regulator comprising: multiple discontinuous conduction mode (DCM) phases coupled in parallel with one another to generate an output voltage at an output node, wherein individual DCM phases of the multiple DCM phases include: an inductor coupled between the output node and an intermediate node; a pull-up transistor coupled between the intermediate node and a supply rail that is to receive a supply voltage; and a pull-down transistor coupled between the intermediate node and a ground terminal. The voltage regulator of Example 11 further comprises a control circuit to: turn on the pull-up transistors of all of the multiple DCM phases when the output voltage drops below a threshold; upon expiration of a first predetermined time period, turn off the pull-up transistor and turn on the pull-down transistor of a first DCM phase of the multiple DCM phases; and upon expiration of a second predetermined time period that is different than the first predetermined time period, turn off the pull-up transistor and turn on the pull-down transistor of a second DCM phase of the multiple DCM phases.

Example 12 is the voltage regulator of Example 11, wherein the control circuit is further to: detect when a current through the inductor of the first DCM phase reaches zero after the pull-down transistor is turned on; and turn off the pull-down transistor responsive to the detection.

Example 13 is the voltage regulator of Example 11, wherein the output voltage is substantially constant between the expiration of the first predetermined time period and the expiration of the second predetermined time period.

Example 14 is the voltage regulator of Example 11, wherein the second predetermined time period is equal to or less than half the first predetermined time period.

Example 15 is the voltage regulator of Example 11, wherein the control circuit is to, upon expiration of one or more additional predetermined time periods that are different than the first and second predetermined time periods, turn off the pull-up transistor and turn on the pull-down transistor of one or more respective additional DCM phases of the multiple DCM phases.

Example 16 is the voltage regulator of Example 11, wherein the voltage regulator is on a same integrated circuit die as a load that is to use the output voltage as a power supply.

Example 17 is a computing system comprising: a motherboard; and an integrated circuit die mounted to the motherboard. The integrated circuit die comprises: a circuit block; a voltage regulator to provide a regulated output voltage to the circuit block at an output node, and a control circuit coupled with the voltage regulator. The voltage regulator includes: two or more discontinuous conduction mode (DCM) phases coupled with the output node and coupled in parallel with one another, wherein individual DCM phases of the two or more DCM phases are operable in a first state in which a current supplied to the output node via the respective DCM phase is to increase and a second state in which the current supplied to the output node via the respective DCM phase is to decrease. The control circuit is to: detect a trigger; switch all of the two or more DCM phases to the first state in response to the detection; upon expiration of a first predetermined time period, switch a first DCM phase of the two or more DCM phases from the first state to the second state; and upon expiration of a second predetermined time period that is shorter than the first predetermined time period, switch a second DCM phase of the two or more DCM phases from the first state to the second state.

Example 18 is the computing system of Example 17, wherein the individual DCM phases include: an inductor coupled between the output node and an internal node; a pull-up transistor coupled between the internal node and the supply rail; and a pull-down transistor coupled between the internal node and the ground terminal; wherein when the respective DCM phase is in the first state, the pull-up transistor is on and the pull-down transistor is off; and wherein when the respective DCM phase is in the second state, the pull-up transistor is off and the pull-down transistor is on.

Example 19 is the computing system of Example 18, wherein the individual DCM phases are further operable in a third state in which no current is to flow through the inductor of the respective DCM phase, wherein the control circuit is further to: switch the first DCM phase from the second state to the third state when a first current through the inductor of the first DCM phase reaches zero; and switch the second DCM phase from the second state to the third state when a second current through the inductor of the second DCM phase reaches zero.

Example 20 is the computing system of Example 17, wherein the output voltage is substantially constant between the expiration of the first predetermined time period and the expiration of the second predetermined time period.

Example 21 is the computing system of Example 17, wherein the second predetermined time period is equal to or less than half the first predetermined time period.

Example 22 is the computing system of Example 17, wherein the control circuit is to, upon expiration of one or more additional predetermined time periods that are different than the first and second predetermined time periods, switch one or more respective additional DCM phases of the two or more DCM phases from the first state to the second state.

Example 23 is the computing system of Example 17, wherein the trigger includes that the output voltage is below a threshold.

Example 24 is the computing system of Example 17, further comprising one or more of a memory circuit, a display, or an antenna coupled to the integrated circuit die.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. An integrated circuit comprising:
   a circuit block; and
   a voltage regulator to provide an output voltage to the circuit block, the voltage regulator including:
   a first discontinuous conduction mode (DCM) phase and a second DCM phase coupled in parallel with one another to generate the output voltage at an output node, wherein the first and second DCM phases each include:
   an inductor coupled between the output node and an intermediate node;
   a pull-up transistor coupled between the intermediate node and a supply rail that is to receive a supply voltage; and
   a pull-down transistor coupled between the intermediate node and a ground terminal; and
   a control circuit to:
   in response to a trigger, turn on the pull-up transistors of the first and second DCM phases, start a first timer with a first duration, and start a second timer with a second duration that is different than the first duration;
   turn off the pull-up transistor of the first DCM phase and turn on the pull-down transistor of the first DCM phase based on expiration of the first timer; and
   turn off the pull-up transistor of the second DCM phase and turn on the pull-down transistor of the second DCM phase based on expiration of the second timer.

2. The integrated circuit of claim 1, wherein the control circuit is further to:
   detect when a current through the inductor of the first DCM phase reaches zero after the pull-down transistor of the first DCM phase is turned on; and
   turn off the pull-down transistor of the first DCM phase based on the detection.

3. The integrated circuit of claim 1, wherein the output voltage is substantially constant between the expiration of the first timer and the expiration of the second timer.

4. The integrated circuit of claim 1, wherein the first duration is equal to or less than half the second duration.

5. The integrated circuit of claim 1, wherein the control circuit is to, upon expiration of one or more additional timers that are different than the first and second durations, turn off a pull-up transistor and turn on a pull-down transistor of one or more respective additional DCM phases.

6. The integrated circuit of claim 1, wherein the trigger includes a detection that the output voltage is below a threshold.

7. The integrated circuit of claim 1, wherein the trigger includes an output of an error amplifier coupled to the output node.

8. The integrated circuit of claim 1, wherein the trigger includes expiration of a timer.

9. The integrated circuit of claim 1, wherein the first duration and the second duration are predefined.

10. A voltage regulator comprising:
multiple discontinuous conduction mode (DCM) phases coupled to an output node and in parallel with one another; and
a control circuit to;
detect a trigger event;
in response to the detection, switch the multiple DCM phases to a charge state;
upon expiration of a first time period from the switch to the charge state, switch a first DCM phase of the multiple DCM phases to a discharge state; and
upon expiration of a second time period from the switch to the charge state, switch a second DCM phase of the multiple DCM phases to the discharge state, wherein the second time period is different than the first time period;
wherein the first and second DCM phases each include:
an inductor coupled between the output node and an internal node;
a pull-up transistor coupled between the internal node and a supply rail; and
a pull-down transistor coupled between the internal node and a ground terminal;
wherein:
when the respective DCM phase is in the charge state, the pull-up transistor is on and the pull-down transistor is off; and
when the respective DCM phase is in the discharge state, the pull-up transistor is off and the pull-down transistor is on.

11. The voltage regulator of claim 10, wherein the trigger event includes:
a detection that the output voltage is below a threshold;
an output of an error amplifier coupled to the output node; or
expiration of a third timer.

12. The voltage regulator of claim 10, wherein the control circuit is further to:
switch the first DCM phase to a tri-state mode when a first current through a first inductor of the first DCM phase reaches zero; and
switch the second DCM phase to the tri-state mode when a second current through a second inductor of the second DCM phase reaches zero.

13. The voltage regulator of claim 10, wherein the first time period is equal to or less than half the second time period.

14. The voltage regulator of claim 10, wherein the first and second time periods have predetermined lengths.

15. The voltage regulator of claim 10, wherein the control circuit is further to switch one or more additional DCM phases of the multiple DCM phases to the charge state, concurrently with the first and second DCM phases, for respective time periods that are different than the first and second time periods.

16. A computer system comprising:
one or more antennas; and
an integrated circuit die coupled to the one or more antennas, the integrated circuit die including:
a circuit block;
a voltage regulator to provide a regulated output voltage to the circuit block at an output node, the voltage regulator including multiple discontinuous conduction mode (DCM) phases coupled with the output node and coupled in parallel with one another;
a control circuit coupled with the voltage regulator, the control circuit to:
detect a trigger;
in response to the detection, switch the multiple DCM phases to a charge state;
upon expiration of a first time period from the switch to the charge state, switch a first DCM phase of the multiple DCM phases to a discharge state; and
upon expiration of a second time period from the switch to the charge state, switch a second DCM phase of the multiple DCM phases to the discharge state, wherein the second time period is different than the first time period;
wherein individual DCM phases of the multiple DCM phases include:
an inductor coupled between the output node and an internal node;
a pull-up transistor coupled between the internal node and a supply rail; and
a pull-down transistor coupled between the internal node and a ground terminal;
wherein when the respective DCM phase is in the charge state, the pull-up transistor is on and the pull-down transistor is off; and
wherein when the respective DCM phase is in the discharge state, the pull-up transistor is off and the pull-down transistor is on.

17. The computer system of claim 16, wherein the trigger includes:
a detection that the output voltage is below a threshold;
an output of an error amplifier coupled to the output node; or
expiration of a third timer.

18. The computer system of claim 16, wherein the control circuit is further to:
switch the first DCM phase to a tri-state mode when a first current through a first inductor of the first DCM phase reaches zero; and
switch the second DCM phase to the tri-state mode when a second current through a second inductor of the second DCM phase reaches zero.

19. The computer system of claim 16, wherein the first time period is equal to or less than half the second time period.

20. The computer system of claim 16, wherein the first and second time periods have predetermined lengths.

21. The computer system of claim 16, wherein the control circuit is further to switch one or more additional DCM phases of the multiple DCM phases to the charge state, concurrently with the first and second DCM phases, for respective time periods that are different than the first and second time periods.

* * * * *